Patented Sept. 26, 1950

2,523,281

UNITED STATES PATENT OFFICE 2,523,281

AUTOMOBILE POLISH

Chester C. Currie, Midland, Mich., assignor to Dow Corning Corporation, Midland, Mich., a corporation of Michigan No Drawing. Application September 26, 1949, Serial No. 117,945

1 Claim. (Cl. 106—3)

This invention relates to automobile polish and its method of preparation.

Automobile polishes heretofore in use have organic waxes as the glossing agent. Whereas such materials produce good surface appearance they suffer from the disadvantages of being difficult to apply and ofttimes setting up when used in direct sunlight. This setting interferes with the application of the polish to the automobile's surface.

It is an object of this invention to provide an automobile polish which may be applied with a minimum of effort and which provides a superior protective coating for the paint. Another object is to provide a polish which will protect automobiles from corrosion due to salt spray.

This invention concerns an emulsion automobile polish having the composition from 2 to 6 per cent by weight of a hydrocarbon soluble organopolysiloxane having from 1 to 3 aryl, alkyl or alkaryl radicals per silicon atom, from 20 to 50 percent by weight of a hydrocarbon solvent boiling between 100° C. and 300° C., from 2 to 20 percent by weight of a finely divided silica having an average particle size of less than 10 microns in diameter, from 2 to 6 percent by weight of an emulsifying agent and from 40 to 70 percent by weight water.

The polishes of this invention are oil in water emulsions which may be prepared by emulsifying a hydrocarbon-siloxane-water mixture and thereafter incorporating the silica in the emulsion. The polish does not cream upon standing nor does an appreciable amount of the silica settle out.

A preferred method is that of mixing the siloxane, the solvent and the emulsifying agent with about 20 percent by weight water and then passing the mixture through a colloid mill. The silica is suspended in additional water, and the suspension is added to the emulsion and the mixture is agitated until an uniform product is obtained.

The order and manner of addition of the various ingredients may be varied without effecting the quality of the polish. For instance, the silica may be added to the emulsion as a powder rather than as an aqueous suspension. Furthermore, the precise method of producing the emulsion is not critical although it has been found that a colloid mill offers a convenient method.

The polysiloxanes employed in this invention are those in which the organic groups are hydrocarbon radicals attached to the silicon through carbon-silicon linkage. The siloxanes have from 1 to 3 organic radicals per silicon atom. These radicals are alkyl, such as methyl, ethyl, propyl and octadecyl, aryl such as phenyl, tolyl, chlorophenyl, xenyl, and alkaryl such as benzyl.

These siloxanes may vary from low viscosity liquids to solids. The only critical feature is that the siloxane be soluble in the defined hydrocarbon solvents.

The preferred solvents are petroleum and coal tar hydrocarbons boiling between 100° C. and 300° C.

Finely divided silica is incorporated in the polish as a cleaner. This material should have an average particle size of less than 10 microns in diameter. Natural occurring silicas such as diatomaceous earth and Tripoli silica have the requisite particle size and are preferred.

The emulsifying agents employed in this invention are commercially available materials and may be of either the cationic, anionic or nonionic types. Examples of such materials which are operative are morpholine salts of fatty acids wherein the fatty acid contains from 12 to 18 carbon atoms, such as morpholine oleate and morpholine stearate; acetates of n-primary amines having from 12 to 18 carbon atoms in the amine chain such as n-dodecyl amine acetate, n-octadecyl amine acetate, n-octadecenyl amine acetate and n-octadecadienyl amine acetate; monoesters of polyethylene glycols and fatty acids of 12 to 18 carbon atoms such as hexaethylene glycol monooleate; and alkylated aryl polyether alcohols.

The polishes of this invention may be applied to the surface of an automobile with a minimum of rubbing. The permanent finish thereby obtained enhances the color and protects the surfacing from corrosion. It has been found that automobiles are more easily cleaned after polishing. For example, rain spots may be removed from the polished surface by merely wiping with a dry cloth, thus greatly reducing the number of times washing is necessary. Due to the hydrophobic nature of siloxanes the polished surface is water repellent and hence corrosion due to salt solutions is greatly retarded. This is of particular value for automobiles in use in coastal areas.

The following examples are illustrative only.

*Example 1*

A solution of 4 parts by weight of a 350 cs. dimethylpolysiloxane fluid, 19 parts by weight of a petroleum solvent boiling between 150° C. and 193° C., 2 parts by weight kerosene and 4 parts by weight morpholine oleate, were mixed with 16 parts by weight water and emulsified by running the mixture through a colloid mill.

A suspension of 14 parts by weight diatomaceous earth in 41 parts by weight water was added to the emulsion and the mixture was vigorously agitated until a uniform product was obtained. The emulsion did not cream upon standing and the diatomaceous earth remained in suspension.

Example 2

A polish was prepared using the ingredients and procedure of Example 1 except that 4 parts by weight of octadecylsilsesquioxane was employed as the siloxane.

Example 3

A polish was prepared using the ingredients and procedure of Example 1 except that 4 parts by weight of a 400 cs. butylmethylpolysiloxane fluid was employed as the siloxane.

Example 4

A solution of 5 parts by weight of a 500 cs. dimethylpolysiloxane fluid, 17.33 parts by weight of a petroleum hydrocarbon boiling between 158° C. and 193° C. and 3 parts by weight of n-octadecyl amine acetate was mixed with 16 parts by weight water and the mixture was emulsified by running it through a colloid mill. 20 parts by weight of diatomaceous earth was suspended in 36.67 parts by weight water and the suspension was added to the emulsion with vigorous agitation. The product did not cream upon standing and the diatomaceous earth did not settle.

Example 5

A solution of 2 parts by weight of a dimethylpolysiloxane fluid, 3 parts by weight of hexaethylene glycol monostearate and 41 parts by weight of a hydrocarbon solvent boiling between 158° C. and 193° C. was mixed with 40 parts by weight water and emulsified by passing the mixture through a colloid mill. 14 parts by weight of a finely divided silica having an average particle size of less than 10 microns in diameter was added to the emulsion with vigorous agitation. The agitation was continued until a uniform product was obtained.

Example 6

A car polish is obtained when a 300 cs. copolymeric fluid containing trimethylsiloxane and phenylmethylsiloxane in amount of 4 percent by weight of the fluid is employed in the method of Example 1.

All of the above compositions perform satisfactorily as car polishes.

That which is claimed is:

An emulsion automobile polish consisting of from 2 to 6 percent by weight of a hydrocarbon-soluble organopolysiloxane having from 1 to 3 hydrocarbon radicals per silicon atom said radicals being selected from the group consisting of aryl, alkyl and alkaryl radicals, from 20 to 50 percent by weight of a hydrocarbon solvent boiling between 100° C. and 300° C., from 2 to 20 percent by weight of a finely divided silica having an average particle size of less than 10 microns in diameter, from 1 to 6 percent by weight of an emulsifying agent selected from the group consisting of morpholine salts of fatty acids having from 12 to 18 carbon atoms in the acid chain, acetates of n-primary amines having from 12 to 18 carbon atoms in the amine chain, monoesters of polyethylene glycols and fatty acids having 12 to 18 carbon atoms in the acid chain and alkylated aryl polyether alcohols, and from 40 to 70 percent by weight water.

CHESTER C. CURRIE.

REFERENCES CITED

The following references are of record in the file of this patent:

UNITED STATES PATENTS

| Number | Name | Date |
|---|---|---|
| 2,141,729 | Thompson | Dec. 27, 1938 |
| 2,177,240 | Brumbaugh | Oct. 24, 1939 |
| 2,349,326 | Wilson | May 23, 1944 |
| 2,406,671 | Diamond | Aug. 27, 1946 |
| 2,482,888 | Walsh | Sept. 27, 1949 |